Aug. 25, 1936.  E. PATERA  2,052,360
CONVEYER BELT PROTECTOR FOR GRAIN HARVESTERS
Filed Sept. 4, 1935  2 Sheets-Sheet 1
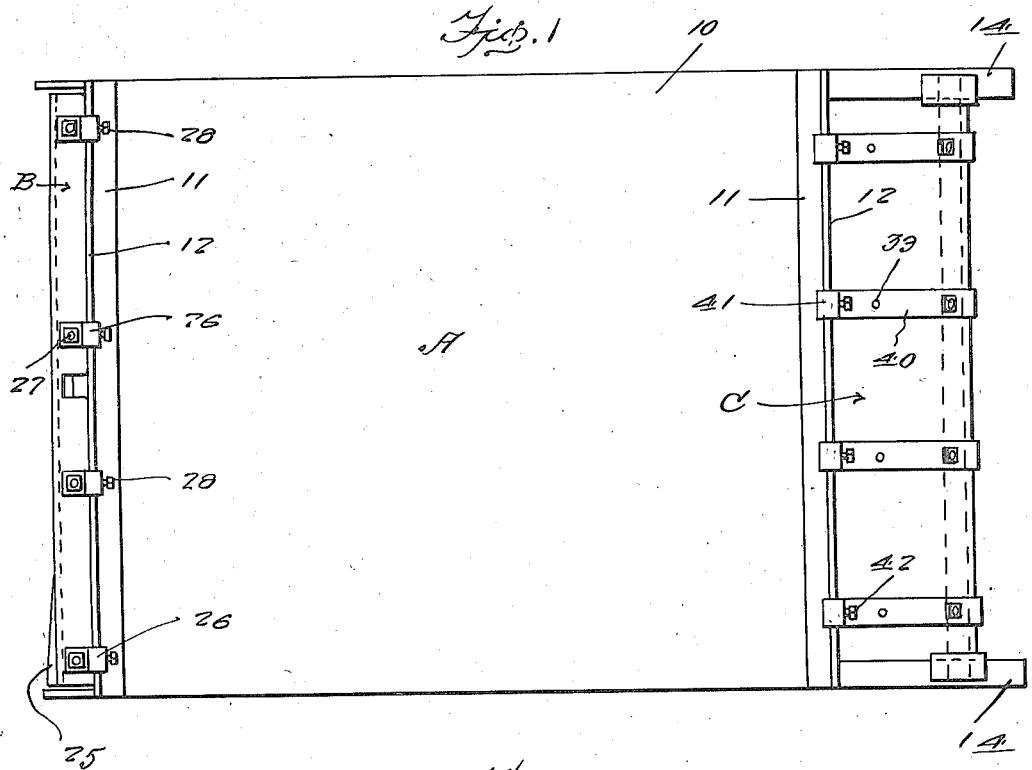
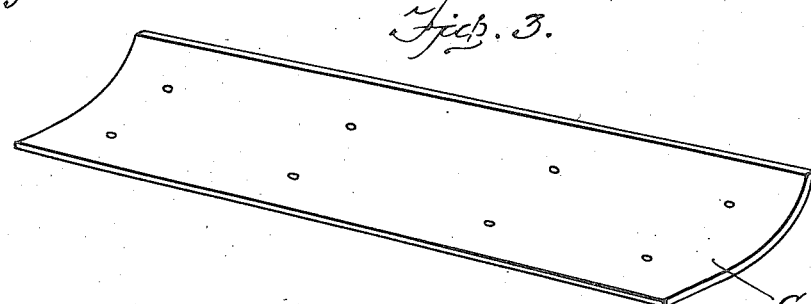
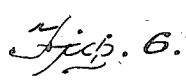
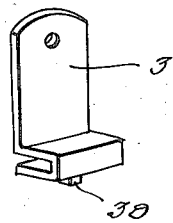
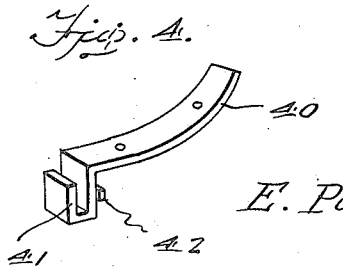
Inventor
E. Patera
By *Clarence A. O'Brien*
Attorney Aug. 25, 1936.  E. PATERA  2,052,360
CONVEYER BELT PROTECTOR FOR GRAIN HARVESTERS
Filed Sept. 4, 1935 2 Sheets-Sheet 2
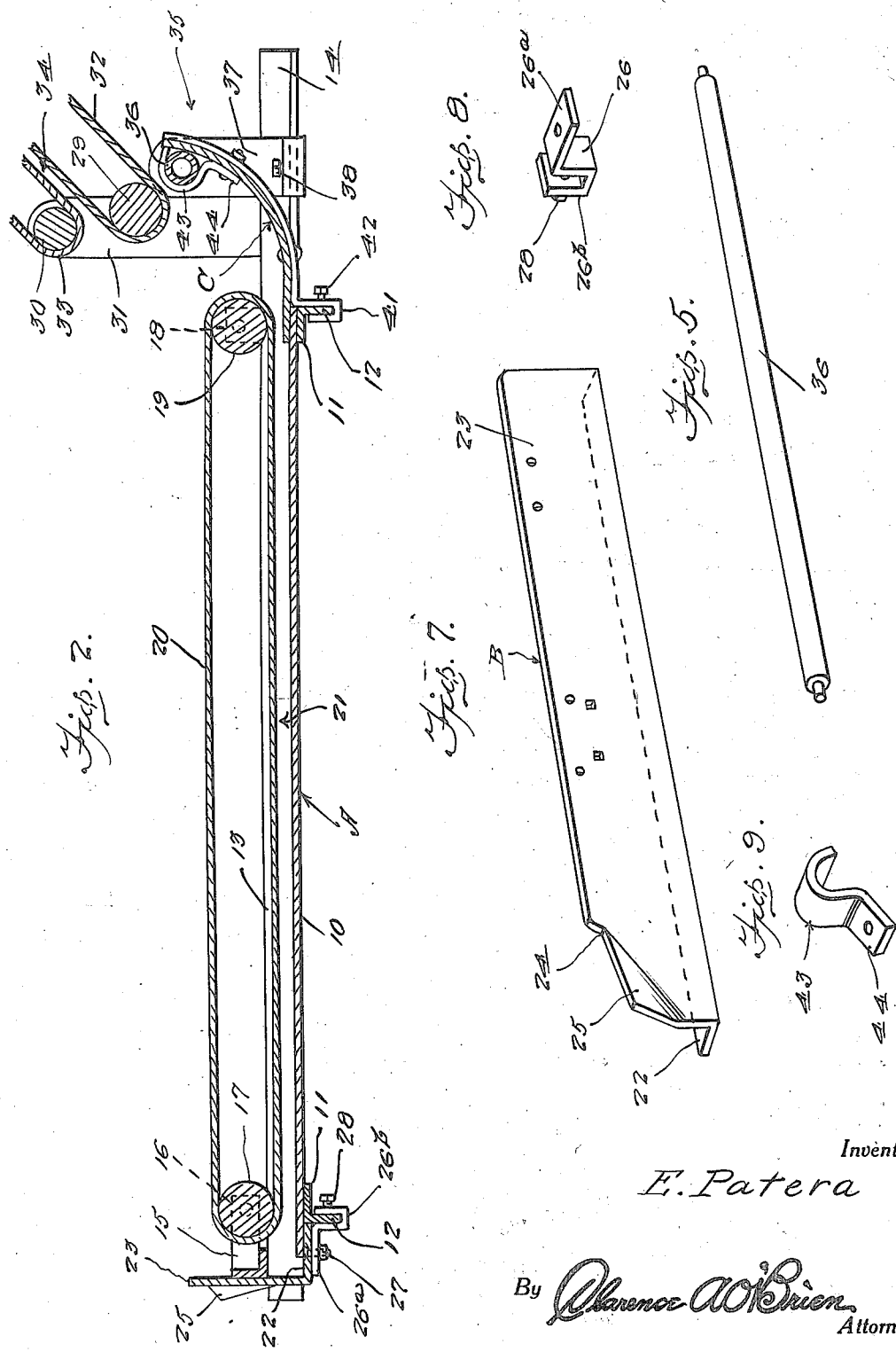
Inventor
E. Patera
By Clarence A. O'Brien
Attorney Patented Aug. 25, 1936

2,052,360

UNITED STATES PATENT OFFICE 2,052,360

CONVEYER BELT PROTECTOR FOR GRAIN HARVESTERS

Eddie Patera, Orient, Iowa

Application September 4, 1935, Serial No. 39,178

1 Claim. (Cl. 56—207)

This invention relates to conveyer belt protectors for grain harvesters.

The primary object of the present invention is to devise a means to prevent the stalks of grain from gaining an entrance under the moving conveying and elevator belts which are customarily made of canvas so as to prevent injury to the belt caused by the stalks.

Another feature of the present invention is to construct one of the guard plates on one end of the harvester platform, to not only act as a baffle, but to direct the stalks from the horizontal conveyer to the elevating conveyer.

Further objects of the invention are to provide a device of the character referred to that is strong, compact, durable, thoroughly reliable for its intended purpose, that is adapted to grain harvesters of conventional structure, and that is comparatively inexpensive to manufacture and to install.

With the foregoing and other objects in view, the invention consists of a novel construction, combination and arrangement of parts as will be hereinafter more specifically described and illustrated in the accompanying drawings, wherein is disclosed an embodiment of the invention, but it is to be understood that changes, variations, and modifications may be resorted to without departing from the spirit of the claim hereunto appended.

In the drawings, wherein like reference characters denote corresponding parts thereof—

Figure 1 is a bottom plan view of the mobile platform of the grain harvester showing an adaptation therewith of the device in accordance with the present invention.

Figure 2 is a detailed vertical sectional view through the platform and a portion of the binder.

Figure 3 is a perspective view of the guard plate that is disposed between the inner end of the horizontal conveyer and the adjacent end of the elevator conveyer.

Figure 4 is a perspective view of the bracket for holding the guard plate shown in Figure 3.

Figure 5 is a perspective view of the support member for the guard plate shown in Figure 3.

Figure 6 is a perspective view of the bracket for attaching the support shown in Figure 5 to the platform.

Figure 7 is a perspective view of the guard plate used on the outer end of the platform.

Figure 8 is a perspective view of the bracket used for attaching the guard plate shown in Figure 7 of the drawings to the platform.

Figure 9 is a perspective view of one of the cleats.

Referring to the drawings in detail, A indicates generally the mobile horizontal platform of a grain harvester that is attached to the frame of the harvester. In the conventional grain harvesters this platform is disposed laterally of the frame of the harvester and ordinarily moves along the ground supported on wheels in a plane horizontal to the surface of the ground. It will be understood that on the leading edge of the platform are supported the cutting knives that sever the stalks of the standing grain as the platform moves along the ground. For the purpose of the present invention it is believed that a clear understanding of the invention will be revealed without a graphic illustration of the cutting knife.

The platform A consists of an imperforate bottom plate 10 of rectangular configuration connected at its side along the margin of the angle bars 11, there being one angle bar at each side of the bottom. One leg 12 of each angle bar depends below the bottom 10, and to the depending legs of the angle bars the guard plates are fastened, as will hereinafter appear. The leading and the trailing ends of the bottom 10 are formed with perpendicular flanges 13, and at the inner ends these flanges merge with the angular extensions 14, there being one extension on the leading end and another on the trailing end of the platform. In the conventional construction of the platform A, is an angle bar 15 at the outer side thereof and the ends of this angle bar are secured to the flanges 13 on the bottom 10. The ends of this angle bar 15 are ordinarily formed with inwardly extending wings 16 and in these wings are journalled the trunnions on the outer roll 17. There is an upstanding wing 18, one on each flange 13, and in each of said wings are journalled the end of the roll 19. The rolls 17 and 19 are in horizontal alignment and trained about these rolls is the horizontal conveyer belt 20 preferably formed of canvas. The lower flight of the horizontal conveyer belt is spaced above the upper face of the bottom plate 10 as indicated at 21, and this space opens at the inner and outer sides of the platform. As the horizontal conveyer belt 20 has the upper flight thereof moving from left to right as shown in Figure 2 of the drawings, some stalks of severed grain pile up at the outer end of the conveyer and form a hard cake which frequently interferes with the operation of the belt. To prevent the stalks from clogging the space 21, I devised an angular shaped guard plate indicated generally at B and shown in Figure 7 of the drawings removed from the platform which at its upper edge extends above the top of the conveyer to assist in causing cut material to fall onto the conveyer instead of between one end thereof and the plate 10.

In the assembled relation, the guard plate B has the horizontal leg 22 thereof disposed inwardly with the edge abutting the depending leg 12 on the outer angle bar 11. The vertical leg 23 of the guard plate B bridges the space 21 and the upper edge thereof extends above the upper flight of the horizontal conveyer belt 20. There is a notch 24 on the rear corner of vertical leg 23. Adjacent the notch, this vertical leg has a triangular portion 25 formed into an outwardly flaring tab which tends to guide the cut material onto the conveyer. At spaced intervals transversely of guard plate B, are secured brackets 26, and one of these brackets is shown enlarged in Figure 6 of the drawings. Brackets 26 include a flat portion 26a merging with a depending channel portion 26b which is adapted to embrace the depending leg 12 on the outer angle bar 11. The flat portion 26a is bolted as at 27 to the bottom of the horizontal leg 22. In the inner wall of the channel portion 26b of each bracket is a set screw 28, and the inner end of this set screw clamps against depending leg 12 whereby the guard plate B is detachably secured to the outer side of the platform. This guard plate prevents stalks from getting under the horizontal conveyer at the outer end of the platform.

Adjacent the inner roll 19 of the horizontal conveyer 20 and confronting the inner end of the horizontal conveyer, are a pair of vertically spaced rollers 29, 30, the ends of which are journalled in a portion 31 of the frame of the harvester. Around these rollers 29 and 30 are trained the pair of elevating conveyer belts 32, 33. These conveyer belts are arranged in parallelism and extend inwardly and upwardly in the conventional harvester structure whereby the stalks of grain are carried upwardly in the space 34 between the confronting faces of the belts. The outer ends of the conveyer belts 32, 33, terminate above the upper flight of horizontal conveyer belt 20 and are in alignment therewith so that the stalks will be transferred from the inner end of the horizontal conveyer belt and carried upwardly by the elevator conveyer belts 32, 33.

In the conventional construction of the harvester, there is a space, indicated generally at 35, between the lower flight of the lower elevating conveyer 32, and in this space the stalks of grain, such as corn stalks, will ordinarily collect and when the stalks clog in this space the sharp ends will sometimes tear or otherwise injure the elevating conveyer belt 32. To eliminate this damage and injury to the conveyer belt 32, I form the guard plate C and dispose it across the mouth of the space 35 as will hereafter appear, to prevent the stalks from entering the space 35. From an inspection of Figure 2 of the drawings it will be seen that there is also a space between roller 29 and roller 19 and by disposing the guard plate C behind this space, it will in some respects aid to direct the stalks being transferred from the horizontal conveyer 20 to the elevator conveyers 32, 33.

In order to mount the guard plate C, I mount a transverse bar 36 in a pair of brackets 37 so as to bridge the space 35. The lower end of the brackets 37 are clamped to the extension 14 by the set screws 38. Guard plate C is transversely curved and extends across the inner end of the platform. To the bottom face of guard plate C are riveted, as at 39, the curved shanks 40 of the supporting brackets. Curved shanks 40 of the bracket merge in hook portions 41 which embrace the depending leg 12 on the inner end of the transverse angle bars 11. In the hook portions are set screws 42 which clamp the guard plate C to the platform. There are preferably four of these supporting members arranged along the width of the guard plate spaced from one another. To the upper face of the guard plate C are secured transversely spaced cleats 43, and these cleats 43 formed with a shank 44 are bolted to the guard plate C. The cleats 43 embrace the member 36 and hold the upper end of the guard plate C adjacent to the roller 39. It will thus be seen that the guard plate C is arranged behind the adjacent rollers 19 and 29 and at the same time closes the space 35 between the lower elevating conveyer 32 and the extension 14.

Having described my invention, what is claimed is:

The combination with a grain harvester characterized by a platform trailing the cutting knives, a horizontally disposed conveyer mounted on the platform above the plane thereof, and an elevating platform carried by the harvester spaced from the inner end of and co-acting with the inner end of the horizontal conveyer to receive and convey the stalks of grain from the horizontal conveyer; of a guard plate secured to the platform at one end forming a buttress to prevent the stalks of grain from entering the space between the horizontal conveyer and the platform; and a second guard plate secured to the platform bridging the space between the confronting ends of the horizontal and elevating conveyers to prevent the stalks from collecting under the horizontal conveyer and at the same time direct the path of the stalks from one conveyer to the other, each of said guard plates being provided with a clamp having a detent constructed and arranged to permit detachable connection of the plate to the desired part of the harvester.

EDDIE PATERA.